US012565987B2

(12) United States Patent
Fan et al.

(10) Patent No.: US 12,565,987 B2
(45) Date of Patent: Mar. 3, 2026

(54) CONDUCTIVE MOUNTING STRUCTURES FOR LIGHTING LAMPS

(71) Applicants: JIAXING LIANGTONG LIGHTING CO.LTD., Jiaxing City (CN); Nathan Joseph Sperling, City of Industry, CA (US); Jacob Sperling, City of Industry, CA (US)

(72) Inventors: Shuqian Fan, Jiaxing City (CN); Nathan Joseph Sperling, City of Industry, CA (US); Jacob Sperling, City of Industry, CA (US); Deyuan Li, Jiaxing City (CN); Li Wang, Jiaxing City (CN)

(73) Assignee: MAXIM LIGHTING INTERNATIONAL, INC., City of Industry (CA)

( * ) Notice: Subject to any disclaimer, the term of this patent is extended or adjusted under 35 U.S.C. 154(b) by 0 days.

(21) Appl. No.: 18/275,588

(22) PCT Filed: Feb. 7, 2022

(86) PCT No.: PCT/CN2022/075386
§ 371 (c)(1),
(2) Date: Aug. 2, 2023

(87) PCT Pub. No.: WO2022/166960
PCT Pub. Date: Aug. 11, 2022

(65) Prior Publication Data

US 2024/0117960 A1 Apr. 11, 2024

(30) Foreign Application Priority Data

Feb. 5, 2021 (CN) ......................... 202120331505.1
Mar. 18, 2021 (CN) ......................... 202120555327.0

(51) Int. Cl.
*F21V 23/06* (2006.01)
*F21S 8/04* (2006.01)

(52) U.S. Cl.
CPC ................ *F21V 23/06* (2013.01); *F21S 8/04* (2013.01)

(58) Field of Classification Search
CPC .................................. F21V 23/06; F21S 8/04
See application file for complete search history.

(56) References Cited

FOREIGN PATENT DOCUMENTS

CN 104359057 A 2/2015
CN 107975767 A 5/2018
(Continued)

OTHER PUBLICATIONS

Kohen, WO 2022159853, Jul. 2022 (Year: 2022).*
(Continued)

*Primary Examiner* — Mary Ellen Bowman
(74) *Attorney, Agent, or Firm* — LOEB & LOEB LLP

(57) ABSTRACT

A conductive mounting structure for a lighting lamp. The lighting lamp comprises a first assembly (1) connected to a power supply and a second assembly (2) having a light source; the first assembly (1) comprises a first mounting member (11), and the second assembly (2) comprises a second mounting member (21). The first assembly (1) and the second assembly (2) are connected by using a connection structure. The connection structure comprises a contact (3), and a conductive component (4) conducted after being in contact with the contact (3), the contact (3) and the conductive component (4) are respectively provided on the first mounting member (11) and the second mounting member (21), and the contact (3) is in contact with the conductive component (4) after the first assembly (1) and the second assembly (2) are assembled and combined.

7 Claims, 1 Drawing Sheet

(56) References Cited

FOREIGN PATENT DOCUMENTS

| | | | |
|---|---|---|---|
| CN | 209399239 | U | 9/2019 |
| CN | 211146166 | U | 7/2020 |
| CN | 215597146 | U | 1/2022 |
| JP | 2017174780 | A | 9/2017 |

OTHER PUBLICATIONS

Liang et al., CN 104359057, Feb. 2015 (Year: 2015).*
Kohen, WO 2018/165058, Sep. 2018 (Year: 2018).*
International Search Report and Written Opinion issued in App. No. PCT/CN2022/075386, dated May 7, 2022, and English Translation, 16 pages.

* cited by examiner

CONDUCTIVE MOUNTING STRUCTURES FOR LIGHTING LAMPS

CROSS-REFERENCE

The present application claims priority to the Application Patent Application with a filing number of 202120331505.1, entitled "Conductive Mounting Structure for Lighting Lamp," and submitted to the Patent Office of the China National Intellectual Property Administration on Feb. 5, 2021, and also claims priority to the Application Patent Application with a filing number of 202120555327.0, entitled "Conductive Mounting Structure for Lighting Lamp," and submitted to the Patent Office of the China National Intellectual Property Administration on Mar. 18, 2021, the contents of which are hereby incorporated by reference.

TECHNICAL FIELD

The present application relates to a conductive mounting structure for a lighting lamp.

BACKGROUND

A lighting lamp according to the prior art mainly comprises a lamp holder fixedly connected to the ceiling, a lampshade, a power supply driver, and a light source. When this lamp is mounted, it is necessary to first fix the lamp holder to the ceiling lamp and fix the light source to the lamp holder, and the power supply driver needs to complete the wiring with the commercial power supply and with the light source. From the above-described structure, it can be seen that it is troublesome to mount the existing lamp, and it is even more troublesome to replace the lamp later.

SUMMARY OF THE APPLICATION

The objective of the present application is to provide a conductive mounting structure for a lighting lamp that has reasonable structure design and rapid and stable mounting.

The technical solution adopted by the present application is as follows: a conductive mounting structure for a lighting lamp, the lighting lamp comprises a first assembly connected to a power supply and a second assembly having a light source; the first assembly comprises a first mounting member, and the second assembly comprises a second mounting member; the first assembly and the second assembly are connected by using a connection structure; the connection structure comprises a contact and a conductive component conducted after being in contact with the contact, the contact and the conductive component are respectively provided on the first mounting member and the second mounting member, and the contact is in contact with the conductive component after the first assembly and the second assembly are assembled and combined.

Here, the connection structure further comprises a first protruding member and a second protruding member that can be vertically stacked with a bump, the first protruding member is provided with a notch for the first protruding member to enter, and after the second protruding member enters the notch and rotates, the first protruding member and the second protruding member are vertically stacked. The first protruding member and the second protruding member are provided on the first mounting member and the second mounting member, respectively.

Here, the contact comprises a first contact, the conductive component comprises a first conductive component, and the first contact, the first conductive component, and the center of circle with respect to which the first protruding member and the second protruding member rotate are disposed concentrically.

Here, the contact comprises a second contact, the conductive component comprises a second conductive component, and the second conductive component is arc shaped; the first contact, the first conductive component, the center of circle with respect to which the first protruding member and the second protruding member rotate, and the center of circle with respect to which the second contact and the second conductive component rotate are disposed concentrically.

Here, the contact comprises a third contact, the conductive component comprises a third conductive component, and the third conductive component is arc shaped; the first contact, the first conductive component, the center of circle with respect to which the first protruding member and the second protruding member rotate, the center of circle with respect to which the second contact and the second conductive component rotate, and the center of circle with respect to which the third contact and the third conductive component rotate are disposed concentrically.

Here, the first protruding member is arc shaped and disposed on the external edge of the first mounting member, and there is a gap underneath the second mounting member for the first mounting member to insert.

Here, one end of the first protruding member close to the notch becomes thinner.

Here, a power supply driver is connected above the first mounting member.

Compared with the prior art, the present application has the following advantageous effects: at the same time when the light source is mounted to the first assembly, the present application completes the structural connection and turns on the electrical connection, leading to a simple mounting procedure.

DESCRIPTION OF THE ACCOMPANYING DRAWINGS

DETAILED DESCRIPTION

The present application will be further described below in combination with the accompanying drawings and through embodiments.

Figure 1:
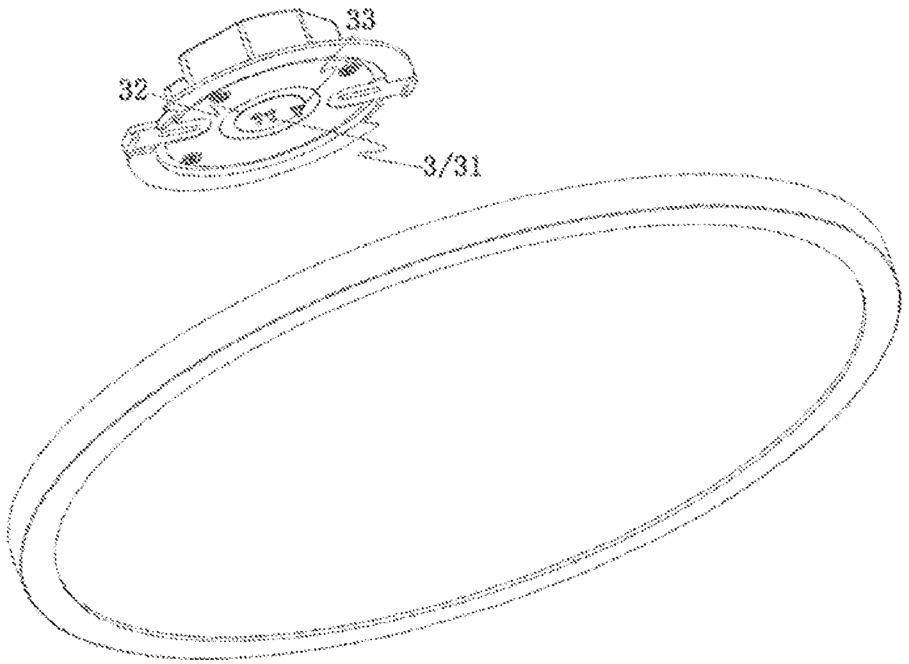
FIG. 1 is a schematic structural diagram of the present application.
Figure 2:
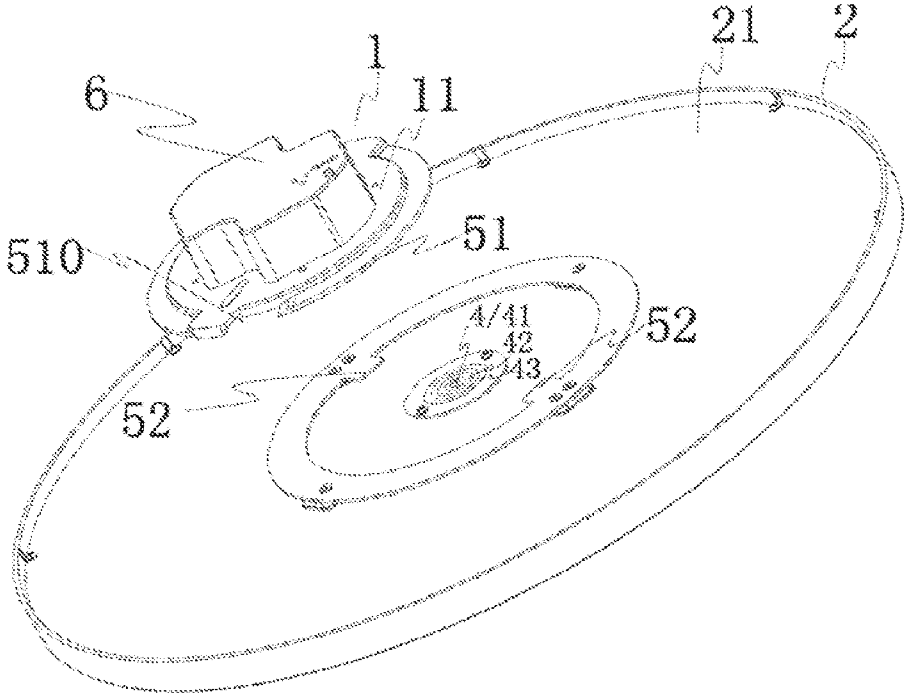
FIG. 2 is a schematic structural diagram from another perspective of FIG. 1.

A conductive mounting structure for a lighting lamp according to the present embodiment is shown in FIG. 1 and FIG. 2, the lighting lamp comprises a first assembly 1 connected to a power supply and a second assembly 2 having a light source; the first assembly 1 comprises a first mounting member 11, and the second assembly 2 comprises a second mounting member 21; the first assembly 1 and the second assembly 2 are connected by using a connection structure; the connection structure comprises a contact 3 and a conductive component 4 conducted after being in contact with the contact 3, the contact 3 and the conductive component 4 are respectively provided on the first mounting member 11 and the second mounting member 21, and the contact 3 is in contact with the conductive component 4 after the first assembly 1 and the second assembly 2 are assembled and combined. In the present embodiment, the connection structure further comprises a first protruding member 51 and a second protruding member 52 that can be vertically stacked with a bump, the first protruding member 51 is provided with a notch 510 for the first protruding member 51 to enter, and after the second protruding member 52 enters the notch and rotates, the first protruding member 51 and the second protruding member 52 are vertically stacked. The first protruding member 51 and the second protruding member 52 are provided on the first mounting member and the second mounting member, respectively. Preferably, the contact 3 can move vertically or is capable of deformation, a power supply driver 6 is connected above the first mounting member 11, the first assembly 1 is connected to a power supply, the first assembly 1 is typically mounted on the ceiling, the second assembly 2 is provided with a light source, and after the first assembly 1 and the second assembly 2 are assembled and combined, the power supply driver 6 can be electrically connected to the light source. The connection to the power supply is completed at the same time when the light source is fixed and mounted, which is more convenient and faster than the prior art where the wiring is completed first, and then the light source is mounted using buckles or fasteners.

In the present embodiment, the contact 3 comprises a first contact 31, the conductive component 4 comprises a first conductive component 41, and the first contact 31, the first conductive component 41, and the center of circle with respect to which the first protruding member 51 and the second protruding member 52 rotate are disposed concentrically. In the present application the combination of the first assembly 1 and the second assembly 2 is implemented in a rotating manner, and the conductive connection structure in cooperation with the assembly structure also needs to be adapted to the assembly structure.

In the present embodiment, the contact 3 comprises a second contact 32, the conductive component 4 comprises a second conductive component 42, and the second conductive component 42 is arc shaped; the first contact 31, the first conductive component 41, the center of circle with respect to which the first protruding member 51 and the second protruding member 52 rotate, and the center of circle with respect to which the second contact 32 and the second conductive component 42 rotate are disposed concentrically. With the adoption of the concentric structure, the contact 3 that is turned on after subsequent assembly and combination will not deviate from its position.

In the present embodiment, the contact 3 comprises a third contact 33, the conductive component 4 comprises a third conductive component 443, and the third conductive component 443 is arc shaped; the first contact 31, the first conductive component 41, the center of circle with respect to which the first protruding member 51 and the second protruding member 52 rotate, the center of circle with respect to which the second contact 32 and the second conductive component 42 rotate, and the center of circle with respect to which the third contact 33 and the third conductive component 443 rotate are disposed concentrically.

In the present embodiment, the first protruding member 51 is arc shaped and disposed on the external edge of the first mounting member 11, and there is a gap underneath the second mounting member 52 for the first mounting member 51 to insert. In the present embodiment, one end of the first protruding member 51 close to the notch becomes thinner. The notch becomes thinner and is easier to be inserted into the gap.

The invention claimed is:

1. A lighting lamp comprising:

a first assembly connected to a power supply, the first assembly including a first mounting member and a first contact; and a second assembly including a light source, a second mounting member, and a first conductive component, wherein the first mounting member and the second mounting member are configured to slidably engage with one another when the second assembly is rotated with respect to the first assembly to mount the second assembly to the first assembly;

wherein the first conductive component is disposed on the second assembly such that when the first assembly and the second assembly are mounted to one another, the first contact is in contact with the first conductive component, thereby electrically connecting the power supply to the light source;

wherein the second mounting member defines a first circle when the second assembly rotates with respect to the first assembly, wherein the first contact is disposed at the center of the first circle.

2. The lighting lamp according to claim 1, wherein the first assembly further comprises a first protruding member including a notch and the second assembly further comprises a second protruding member, wherein the notch is configured to receive the second protruding member, and wherein the second assembly is configured to rotate with respect to the first assembly resulting in the first protruding member and the second protruding member being vertically stacked.

3. The lighting lamp according to claim 1 further comprising:

a second contact, a second conductive component, and the second conductive component is arc-shaped, and the second contact defines a second circle as the second assembly rotates with respect to the first assembly;

wherein the first circle and the second circle are concentric with one another.

4. The lighting lamp according to claim 3, further comprising:

a third contact, third conductive component, and the third conductive component is arc-shaped and the third contact defines a third circle as the second assembly rotates with respect to the first assembly;

wherein the first circle, the second circle, and the third are concentric with one another.

5. The lighting lamp according to claim 2, wherein the first protruding member is arc shaped and disposed on an external edge of the first mounting member, and wherein a gap is formed underneath the second mounting member into which the first mounting member is configured to be inserted.

6. The lighting lamp according to claim 2, wherein an end of the first protruding member disposed adjacent to the notch is thinner than other portions of the first protruding member.

7. The lighting lamp according to claim 1, wherein a power supply driver is connected above the first mounting member.

* * * * *